United States Patent [19]
Sasaki

[11] Patent Number: 6,061,621
[45] Date of Patent: May 9, 2000

[54] TRACTION CONTROLLER TO REDUCE SLIP OF DRIVE WHEELS FOR A VEHICLE

[75] Inventor: Hiroki Sasaki, Yokohama, Japan

[73] Assignee: Nissan Motor Co., Ltd., Yokohama, Japan

[21] Appl. No.: 08/831,428

[22] Filed: Apr. 1, 1997

[30] Foreign Application Priority Data

Apr. 5, 1996 [JP] Japan .................................. 8-084003

[51] Int. Cl.[7] .............................. G06G 7/76; G06F 7/70
[52] U.S. Cl. .............................. 701/82; 701/84; 701/86; 180/197; 303/139
[58] Field of Search ................................. 701/82, 84, 86, 701/87, 90, 92, 91, 83, 74, 72; 180/197, 249, 248; 303/139

[56] References Cited

U.S. PATENT DOCUMENTS

| | | | |
|---|---|---|---|
| 5,012,882 | 5/1991 | Oomo et al. ............................. | 180/197 |
| 5,046,461 | 9/1991 | Kanehiro et al. ....................... | 180/197 |
| 5,283,742 | 2/1994 | Wazaki et al. ............................ | 701/86 |
| 5,463,551 | 10/1995 | Milunas .................................... | 701/91 |
| 5,529,140 | 6/1996 | Yamashita et al. ....................... | 701/32 |
| 5,590,636 | 1/1997 | Yamashita ................................ | 180/197 |
| 5,729,455 | 3/1998 | Yamashita et al. ...................... | 701/84 |
| 5,737,713 | 4/1998 | Ikeda et al. ............................... | 701/84 |

FOREIGN PATENT DOCUMENTS

1-227830  9/1989  Japan .
4-295146 10/1992  Japan .

*Primary Examiner*—Jacques H. Louis-Jacques
*Attorney, Agent, or Firm*—Foley & Lardner

[57] ABSTRACT

In a traction controller for cutting fuel supply to the cylinders of a multi-cylinder engine based on a slip factor of the drive wheels of a vehicle, an ordinary fuel cut mode in which fuel is cut to only some cylinders and a multi-cylinder fuel cut mode in which fuel is cut to a larger number of cylinders are provided. When the slip factor exceeds a first threshold value, ordinary fuel cut begins, and when the fuel cut duration time exceeds a predetermined value and the slip factor exceeds a second threshold value higher than the first threshold value, multi-cylinder fuel cut is performed. In this way, the drive wheels are prevented from slipping while preventing hunting of the slip factor due to multi-cylinder fuel cut and temperature rise of a catalytic converter.

8 Claims, 11 Drawing Sheets

FIG.11C

TRACTION CONTROLLER TO REDUCE SLIP OF DRIVE WHEELS FOR A VEHICLE

FIELD OF THE INVENTION

This invention relates to traction control of a drive wheel of a vehicle by means of cutting fuel supply to an engine of the vehicle.

BACKGROUND OF THE INVENTION

Automobile traction control systems function to prevent the vehicle tires from rotating without gripping the road due to excessive drive force when the vehicle is traveling or accelerating on a slippery road surface, such as a road covered with ice, snow or gravel. This may be achieved by cutting fuel supply to the engine so as to decrease the drive force.

A fuel cut controller for this purpose is described for example in Tokkai Hei 4-295146 published in 1992 and 1-227830 published in 1991 by the Japanese Patent Office.

In this controller, the rotation speeds of the drive wheels and driven wheels are detected, and a slip factor between the drive wheels and road surface is computed from the difference between the two speeds. When the slip factor is greater than a set value, the fuel supply to a predetermined cylinder of the engine is cut based on the slip factor. As a result, when the vehicle starts to slip due to excessive drive force, the drive force of the drive wheels is rapidly decreased so as to suppress the slip.

However, when the fuel supply to some of the engine cylinders is cut, the air supplied to cylinders to which fuel supply has stopped, and exhaust including unburned fuel from cylinders to which fuel supply has not stopped, flow into the catalytic converter in the exhaust system. Depending on the engine running conditions, unburned fuel in the converter may react with the air, thereby causing the catalyst temperature to rise above the tolerance level and leading to catalyst deterioration.

In the aforesaid controller, the period during which fuel cut is performed is limited, and fuel cut is prohibited for a certain period after a preceding fuel cut has been made, so that the catalyst temperature does not rise above a certain level.

According to this controller, however, fuel cut is subsequently prohibited for a predetermined period when fuel cut has continued for a prescribed time, and fuel supply is then restarted to all cylinders even when the slip factor of the drive wheels is large. Hence, although temperature rise of the catalytic converter is prevented, the engine drive force cannot be adequately suppressed, and the effect of preventing the drive wheels from slipping remains limited.

SUMMARY OF THE INVENTION

It is therefore an object of this invention to enhance the effect of preventing drive wheels from slipping by fuel cut while controlling a temperature rise of a catalytic converter.

It is a further object of this invention to prevent the slip factor of the drive wheels from hunting due to a fuel cut.

In order to achieve the above objects, this invention provides a traction controller for cutting the fuel supply to a cylinder of a multi-cylinder engine of a vehicle in order to reduce the slip of drive wheels of the vehicle. The controller comprises a mechanism for detecting a slip factor of the drive wheels, a mechanism for determining whether or not the slip factor has exceeded a first threshold value, a mechanism for performing ordinary fuel cut when the slip factor has exceeded the first threshold value, a mechanism for measuring a first period during which the ordinary fuel cut is performed, a mechanism for determining whether or not the first period has exceeded a set value, a mechanism for determining whether or not the slip factor has exceeded a second threshold value higher than the first threshold value, and a mechanism for performing multi-cylinder fuel cut in which fuel is cut in a large number of cylinders when the first period has exceeded the set value and the slip factor has exceeded a second threshold value.

It is preferable that the controller further comprises a mechanism for making the second threshold value decrease with increasing vehicle speed in a vehicle speed range below a predetermined speed, and making the second threshold value increase with increasing vehicle speed in a vehicle speed range above the predetermined speed.

It is also preferable that the controller further comprises a mechanism for determining whether or not the slip factor is less than a third threshold value when multi-cylinder fuel cut is performed, this third threshold value being set smaller than the second threshold value, but larger than the first threshold value, and a mechanism for stopping the multi-cylinder fuel cut when the slip factor becomes less than the third threshold value.

It is also preferable that the controller further comprises a mechanism for measuring a second period during which the multi-cylinder fuel cut is performed, a mechanism for determining whether or not the second period has exceeded a predetermined value, and a mechanism for stopping the multi-cylinder fuel cut when the second period has reached the predetermined value.

The details as well as other features and advantages of this invention are set forth in the remainder of the specification and are shown in the accompanying drawings.

DESCRIPTION OF THE PREFERRED EMBODIMENTS

Figure 1:
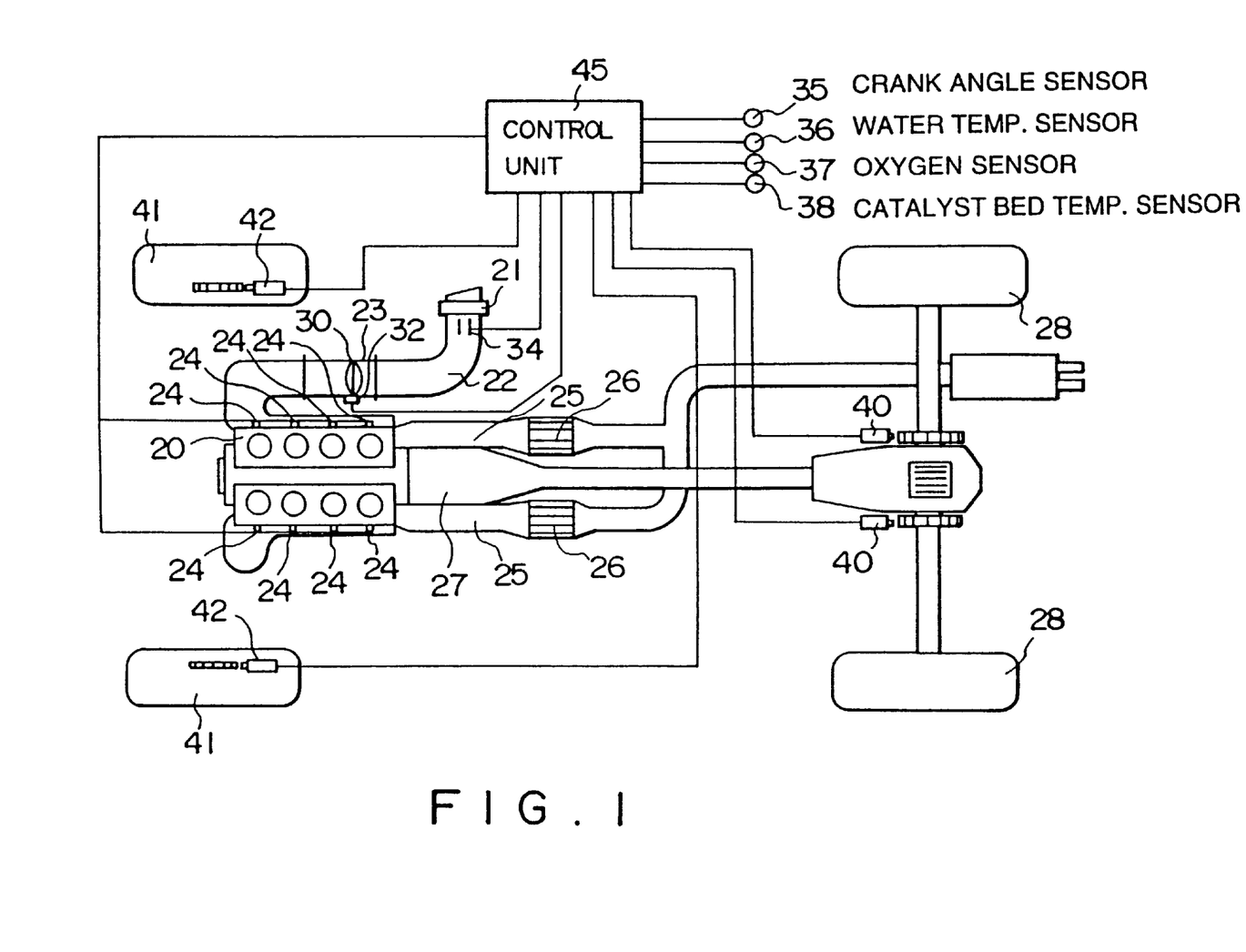
FIG. 1 is a schematic diagram of a traction controller according to this invention.

Referring to FIG. 1 of the drawings, intake air of an automobile engine 20 is supplied to the engine cylinders via an air cleaner 21, an intake pipe 22, a throttle chamber 23, branches of an intake manifold and intake ports opening to the cylinders. Fuel is injected to each intake port from a fuel injector 24 provided in each cylinder, and is supplied to a combustion chamber in the cylinder as it is mixed with intake air.

The fuel mixture in the combustion chamber is ignited by the electric discharge of a spark plug, and explodes. Exhaust gas is expelled to the outside via an exhaust pipe 25. A catalytic converter 26 is installed midway along the pipe 25. The action of this three-way catalytic converter oxidizes HC and CO, and reduces NOx, in the exhaust.

A throttle valve 30 which opens and closes in response to the operation of an accelerator pedal is provided in the throttle chamber 23. The opening of the throttle valve 30 is detected by a throttle sensor 32, the intake air flowrate is detected by an air flow meter 34, and the rotation speed of the engine 20 is detected by a crank angle sensor 35. The temperature of the cooling water of the engine 20 is detected by a water temperature sensor 36, and the oxygen concentration of the exhaust is detected by an oxygen sensor 37. The catalyst bed temperature of the catalytic converter 26 is detected by a catalyst bed temperature sensor 38.

The output torque of the engine 20 is transmitted to drive wheels 28 via a transmission 27. The rotation speed of the drive wheels 28 of the vehicle is detected by a drive wheel speed sensor 40, and the rotation speed of driven wheels 41 is detected by a driven wheel speed sensor 42. These detected rotation speeds are both averages for the left and right wheels.

Signals from the sensors 32, 34–38, 40 and 42 are input to a control unit 45 comprising a microcomputer.

Based on the input signals, the control unit 45 performs fuel injection control of the fuel injectors 24, and performs traction control of the vehicle.

Figure 2:
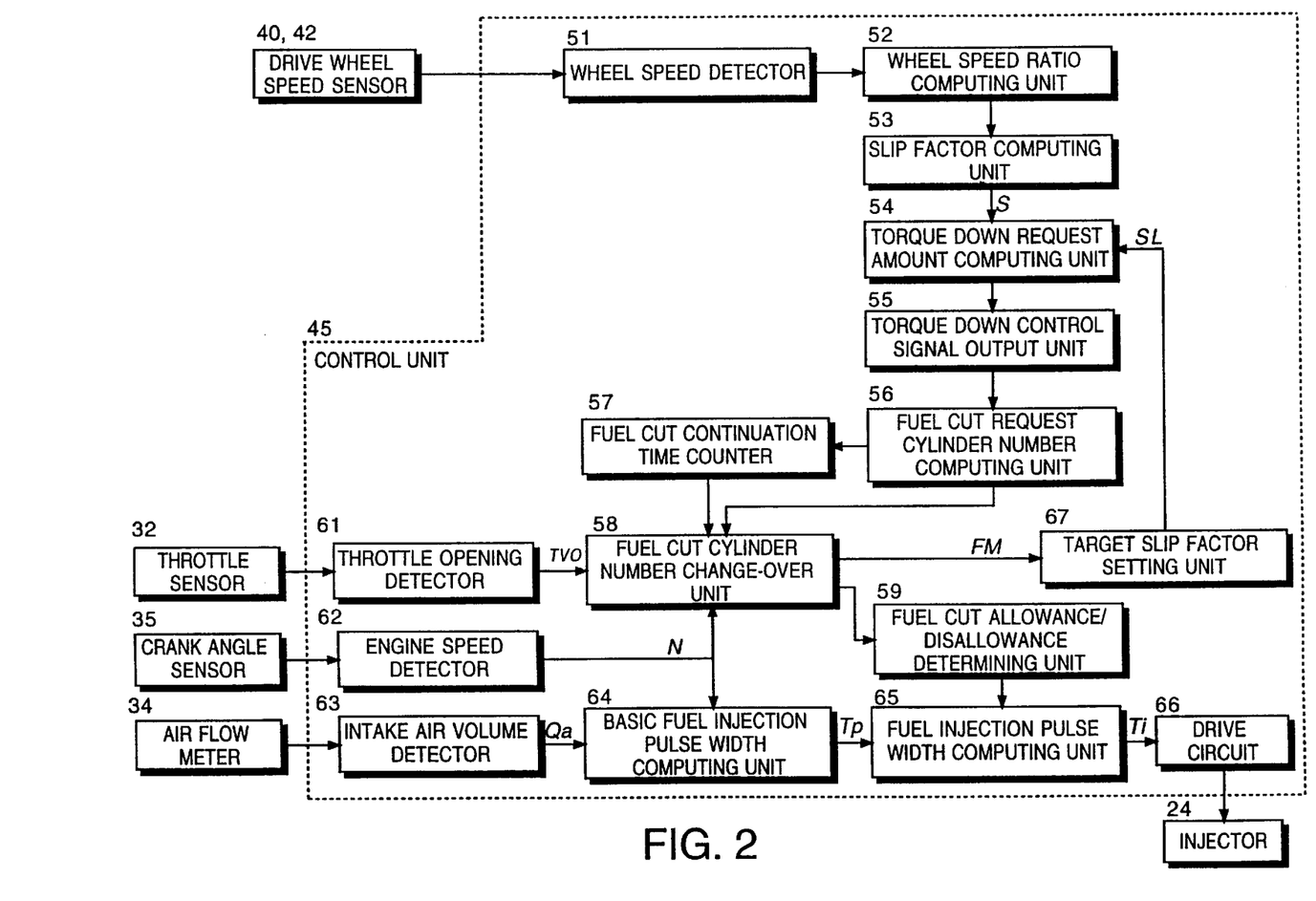
FIG. 2 is a block diagram describing the function of a control unit according to this invention.

The control unit 45 comprises a throttle opening detector 61 to which a detection signal is input from the throttle sensor 32, an engine speed detector 62 to which a detection signal is input from the crank angle sensor 35, an intake air volume detector 63 to which a detection signal is input from the air flow meter 34, a basic fuel injection pulse width computing unit 64 which computes a basic fuel injection pulse Tp based on a detected engine speed N and intake air volume Qa, a fuel injection pulse width computing unit 65, and a drive circuit 66 which outputs a fuel injection pulse signal to the injectors 24, as shown in FIG. 2.

Fuel injection control is performed as follows. First, a basic injection amount Tp is computed based on the detected intake air volume Qa and engine speed N by the following relation.

$$Tp = \frac{K \cdot Qa}{N} \quad (1)$$

where K is a constant.

This basic injection amount Tp is corrected by the following equation based on the cooling water temperature Tw, throttle opening TVO and oxygen concentration, and a fuel injection amount Ti is computed.

$$Ti = Tp \cdot (1 + K_{TW} + K_{AS} + K_{AI} + K_{ACC} + K_{DEC}) \cdot K_{FC} + Ts \quad (2)$$

where: $K_{TW}$=water temperature increase correction coefficient $K_{AS}$=increase correction coefficient during and after start-up $K_{AI}$=increase correction coefficient after idle period $K_{ACC}$=acceleration correction coefficient $K_{DEC}$=deceleration correction coefficient $K_{FC}$=fuel cut correction coefficient Ts=battery voltage correction The control unit 45 performs fuel injection control by outputting a pulse signal corresponding to the computed fuel injection amount Ti to the fuel injectors 24.

The control unit 45 further comprises a wheel speed detector 51 to which the detection signals from the wheel speed sensors 40, 42 are input, wheel speed ratio computing unit 52 which computes a rotation speed ratio of the driven wheels 41 and drive wheels 28, slip factor computing unit 53 which computes a slip factor of the drive wheels from the rotation speed ratio of the driven wheels 41 and drive wheels 28, torque-down request amount computing unit 54 which computes a torque-down request amount of the engine 20 according to the slip factor and a torque-down control signal output unit 55 which outputs a torque-down control signal according to a torque-down request amount, as shown in FIG. 2.

Figure 3:
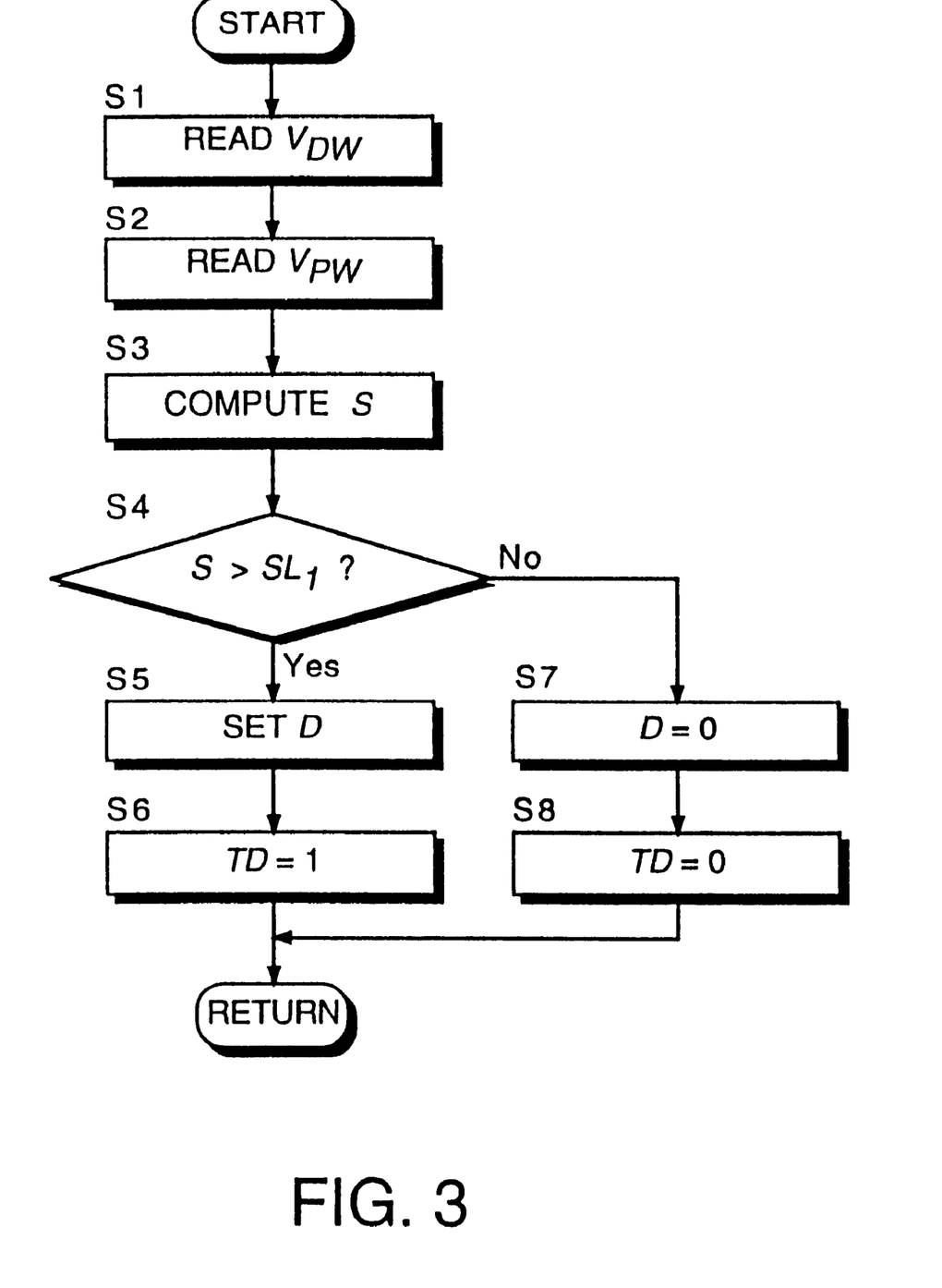
FIG. 3 is a flowchart describing a torque-down request amount determining process performed by the control unit.

Due to the aforesaid construction, the control unit 45 performs a torque-down determination of the vehicle according to the flowchart of FIG. 3.

First, as shown in the flowchart of FIG. 3, a torque-down request amount when the drive wheels 28 slip, is computed. The routine shown in FIG. 3 is executed at fixed intervals.

A drive wheel speed $V_{DW}$ is read in a step S1, a driven wheel speed $V_{PW}$ is read in a step S2, and a slip factor S is computed in a step S3.

$$S = \frac{V_{DW} - V_{PW}}{V_{PW}} \quad (3)$$

When this slip factor S is larger than a first threshold value $SL_1$, it is determined that the drive wheels 28 are slipping. In this case, a torque-down request amount D is set according to the slip factor in a step S5, and a torque-down request flag TD is set to 1 in a step S6.

When the slip factor S is smaller than or equal to the first threshold value $SL_1$, it is determined that the drive wheels 28 are not slipping. In this case, the routine proceeds to a step S7, the torque-down request amount D is set to 0, and the torque-down request flag TD is reset to 0 in a step S8.

The control unit 45 is further provided with a cut request cylinder number computing unit 56 as shown in FIG. 2. An ordinary fuel cut mode and a multi-cylinder fuel cut mode are set in the cut request cylinder number computing unit 56. In the ordinary fuel cut mode, fuel supply is cut to some cylinders for a torque-down request time, and the number of cylinders to which fuel supply is stopped is determined according to the torque-down request amount D up to a predetermined upper limit of cylinder number. In the multi-cylinder fuel cut mode, fuel supply is cut to a number of cylinders equal to or larger than this limiting number. The control unit 45 computes the number of cylinders to which fuel supply is cut according to either one of these modes.

The control unit 45 further comprises a fuel cut continuation time counter 57 unit which computes a time for which fuel cut continues in each mode, a fuel cut cylinder number change-over unit 58 which changes over between the ordinary fuel cut mode and multi-cylinder fuel cut mode according to the time for which fuel cut continues in each mode, and a fuel cut allowance/disallowance determining unit 59 which commands fuel cut, but to the extent that the engine 20 would not stop running.

Figure 4A:
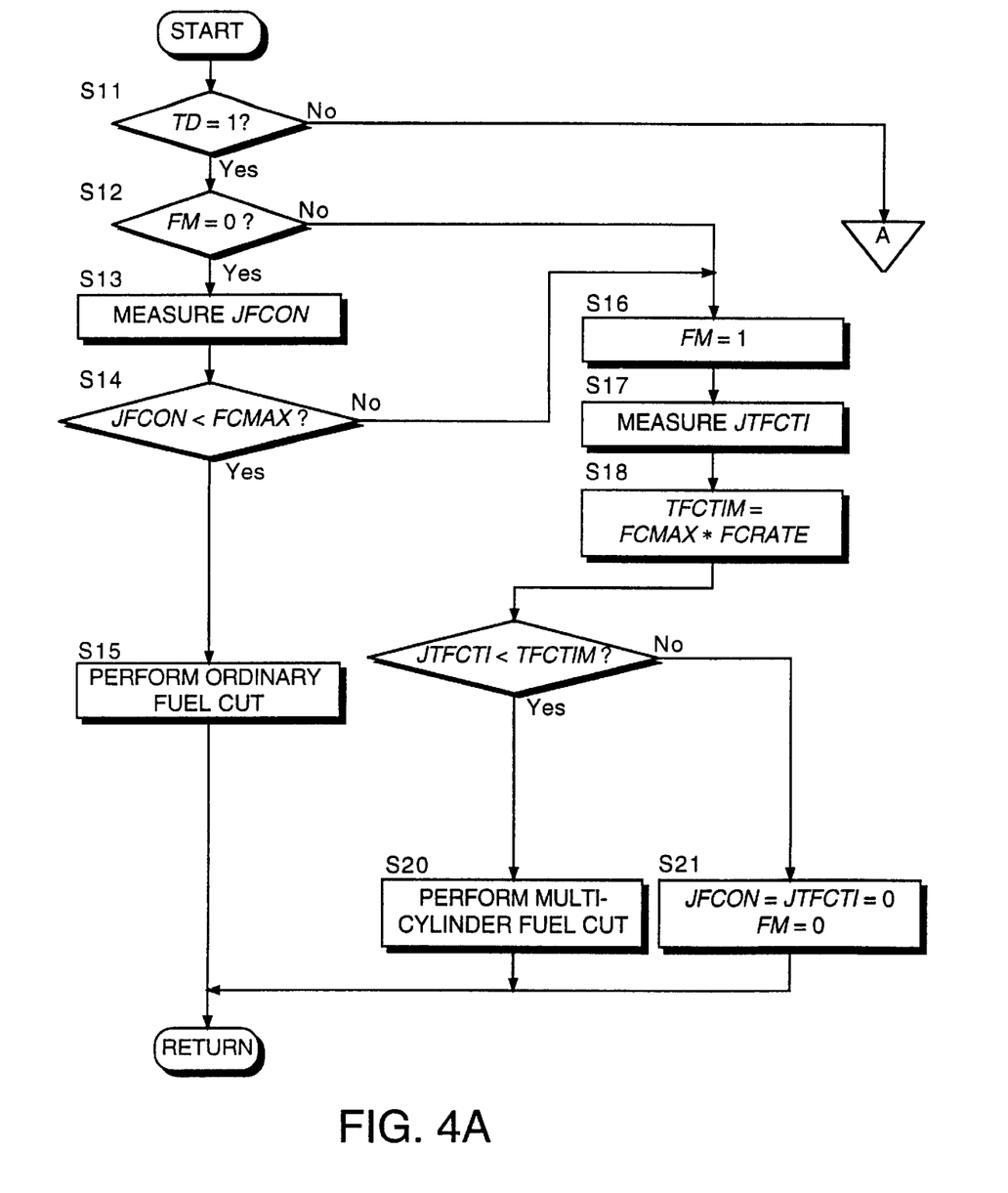
FIGS. 4A and 4B are flowcharts describing a fuel cut control process performed by the control unit.
Figure 4B:
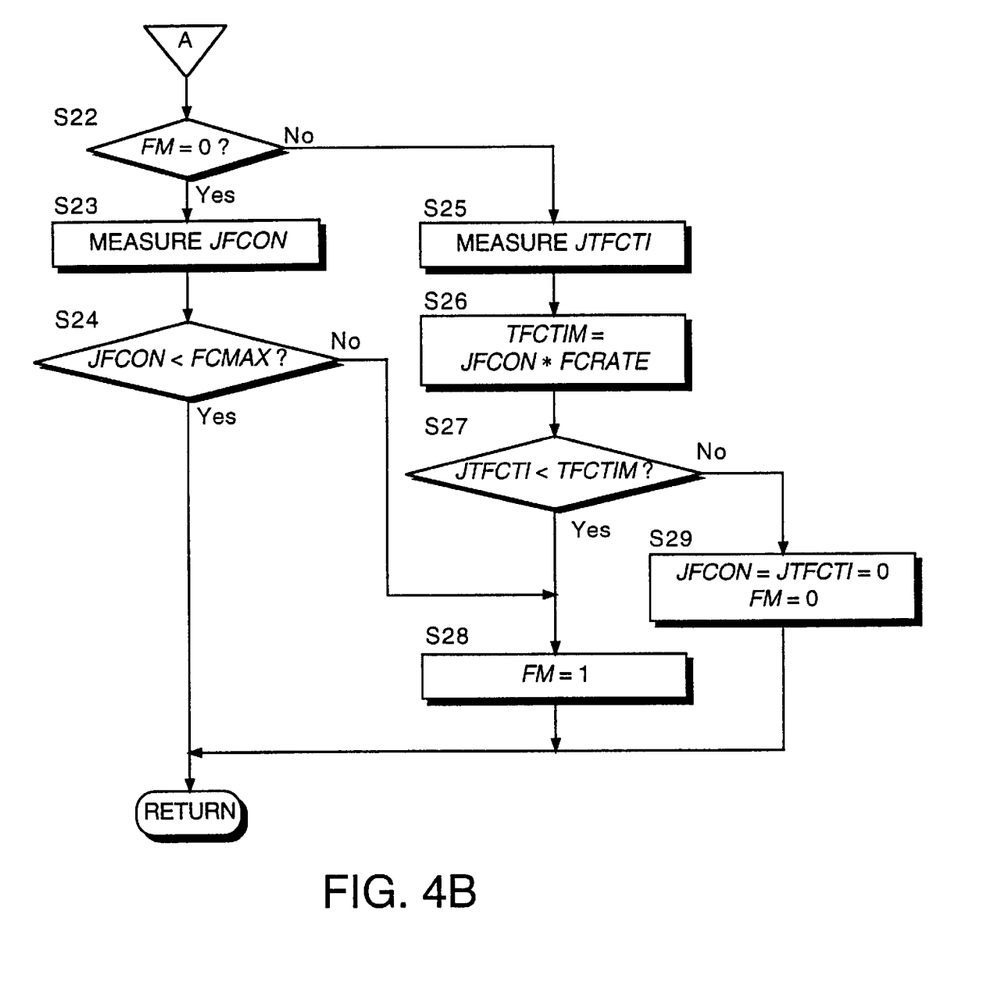

Due to the aforesaid construction, the control unit 45 performs torque down control at fixed intervals according to the flowcharts of FIGS. 4A and 4B based on the result of the torque down determining process of FIG. 3.

In this process, it is first determined in a step S11 whether or not the torque-down request flag TD=1, i.e. whether or not fuel cut has been requested.

When TD=1, the routine proceeds to a step S12, and it is determined by a mode determining flag FM whether the present control is the ordinary fuel cut mode or the multi-cylinder fuel cut mode. FM=0 denotes the ordinary fuel cut mode, and FM=1 denotes the multi-cylinder fuel cut mode.

When FM=0, the routine proceeds to a step S13, a continuation time JFCON of the ordinary fuel cut mode is measured, and it is determined in a step S14 whether or not the continuation time JFCON is less than a maximum continuation time set value FCMAX. FCMAX may be set to for example 1 second.

When JFCON is less than FCMAX, the routine proceeds to a step S15, and fuel cut is performed in the ordinary fuel cut mode. This fuel injection cut stops fuel injection from the fuel injectors 24 corresponding to a number of cylinders determined according to the torque-down request amount D up to a predetermined limit as described hereinabove. The control process is disclosed in the aforesaid examples of the prior art.

On the other hand when JFCON is equal to or greater than FCMAX in the step S14, the mode determining flag FM is set to 1 in a step S16, and control shifts to the multi-cylinder fuel cut mode in a step S17 and subsequent steps.

In the step S17, a multi-cylinder fuel cut mode continuation time JTFCTI is measured, and in a step S18, a maximum continuation time set value TFCTIM in the multi-cylinder fuel cut mode is computed by the following equation.

$$TFCTIM = FCMAX \cdot FCRATE \quad (4)$$

Figure 5:
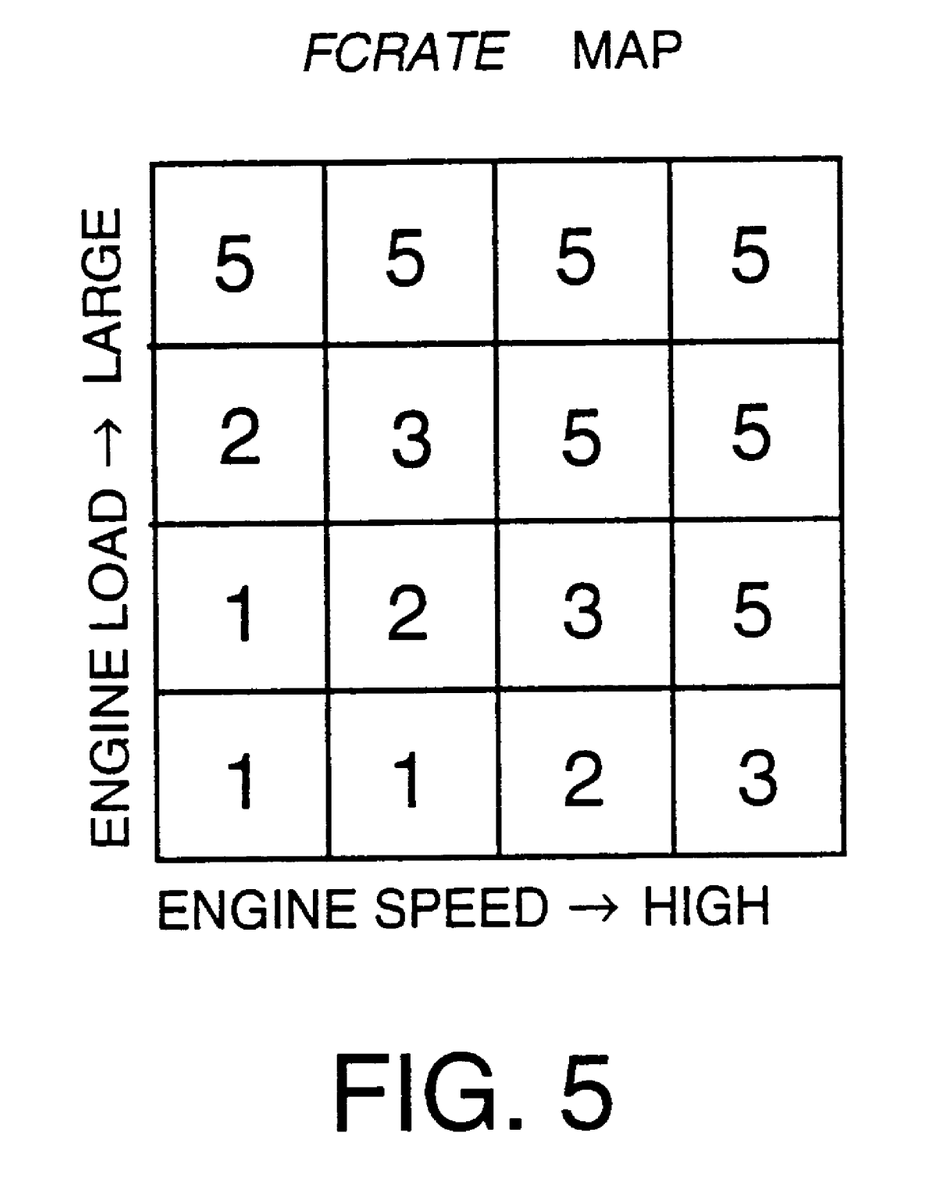
FIG. 5 is a map of a time ratio FCRATE stored in the control unit.

FCRATE is a time ratio set according to an engine load and the engine speed N from a map shown in FIG. 5. According to this map, FCRATE is set to be smaller the lower the speed of the engine 20 and the less the load on the engine 20.

Next, in a step S19, it is determined whether or not the multi-cylinder fuel cut mode continuation time JTFCTI is less than the maximum continuation time set value TFCTIM.

When JTFCTI is less than TFCTIM, the routine proceeds to a step S20, and fuel injection is cut from a fuel injector 24 in a predetermined cylinder set in the multi-cylinder fuel cut mode. In this multi-cylinder fuel cut mode, the number of cylinders in which fuel injection is stopped is set equal to or above the upper limit of cylinder number for performing fuel cut in the ordinary fuel cut mode. In the case of an eight cylinder engine, therefore, if the upper limit of cylinder number in the ordinary fuel cut mode is six, for example, fuel injection is stopped in six or more cylinders in the multi-cylinder fuel cut mode.

When JTFCTI has reached or exceeded TFCTIM in the step S19, the routine proceeds to a step S21, the fuel cut mode continuation times JFCON, JTFCTI are cleared, and the mode determining flag FM is reset to 0.

Subsequently, fuel injection is again cut from the fuel injectors 24 in predetermined cylinders in the ordinary fuel cut mode.

When TD=0 in the step S11, i.e. when there is no fuel cut request, the routine proceeds to a step S22 and subsequent steps. In the step S22, it is determined by the mode determining flag FM whether the present control is the ordinary fuel cut mode or the multi-cylinder fuel cut mode, as in the step S12.

When FM=0, i.e., in the case of the ordinary fuel cut mode, the ordinary fuel cut mode continuation time JFCON is measured in a step S23, and it is determined whether or not JFCON is less than the maximum continuation time set value FCMAX in a step S24.

When JFCON is less than FCMAX, the routine is executed from the step S11 in the next execution period of the process. When JFCON is equal to or greater than FCMAX, the mode determining flag FM is reset to 1 in a step S28, and the routine is executed from the step S11 in the next execution period of the process.

When FM=1 in the step S22, the routine proceeds to a step S25, and the multi-cylinder fuel cut continuation time JTFCTI is measured. In a step S26, the maximum continuation time set value TFCTIM is measured by the aforesaid equation (4), and it is determined whether or not JTFCTI has reached TFCTIM in the step S27.

When JTFCTI has not reached TFCTIM, the mode determining flag FM remains 1 in the step S28.

When JTFCTI is equal to or greater than TFCTIM, the routine proceeds to a step S29, the fuel cut mode continuation times JFCON, JTFCTI are both cleared and the mode determining flag is reset to 0.

In this way, even when there is no fuel cut request, measurement of the ordinary fuel cut mode continuation time JFCON and the multi-cylinder fuel cut mode continuation time JTFCTI is continued. When these times exceed respectively the maximum continuation time set values FCMAX and TFCTIM, the fuel cut mode is changed, and when there is a further fuel cut request, fuel cut is performed according to the mode at that time.

The fuel cut which takes place under the aforesaid control will now be described with reference to FIGS. 6A and 6B.

Figure 6A:
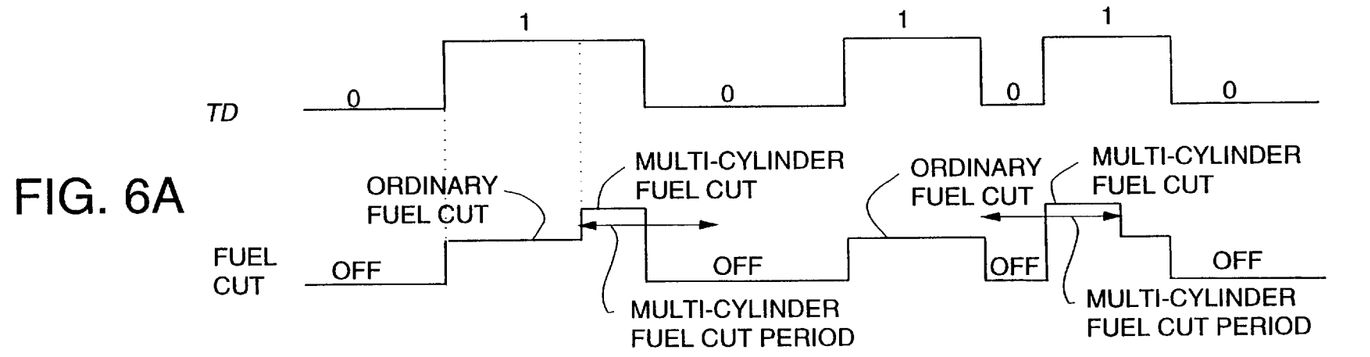
FIGS. 6A and 6B are timing charts comparing a fuel cut according to this invention with that of a prior art controller.
Figure 6B:
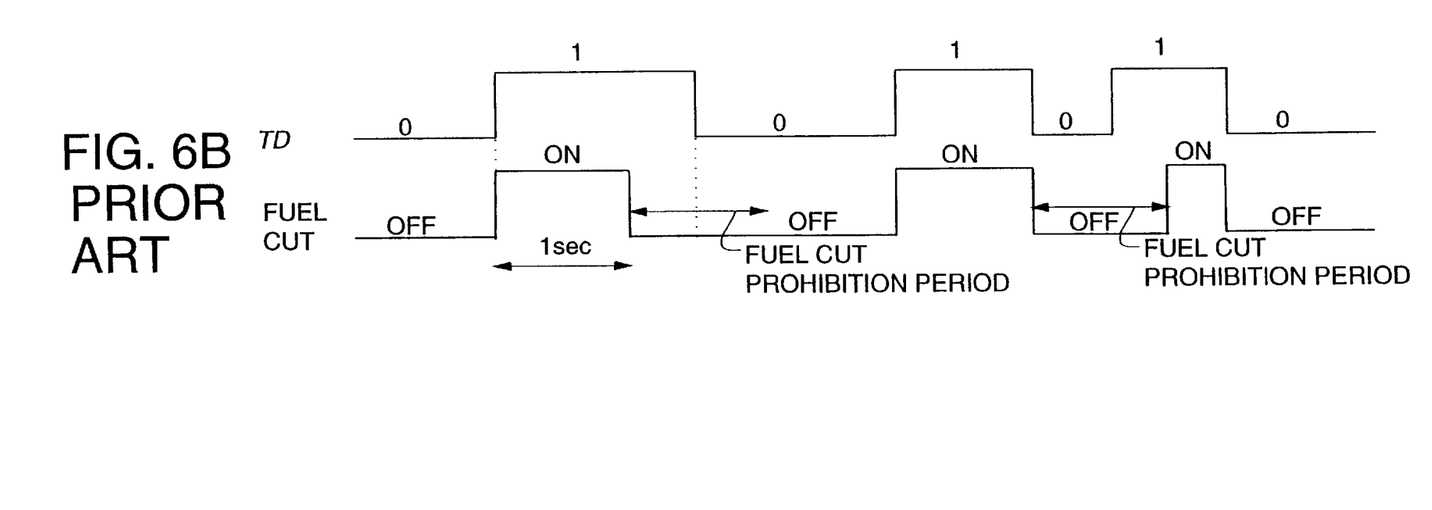

In the aforesaid prior art controller having a fuel cut prohibition region, even when the slip factor of the drive wheels 28 is high and the slip cannot be controlled in the ordinary fuel cut mode, the fuel injectors 24 in all cylinders restart fuel injection when the fuel cut request continuation time exceeds the maximum continuation time set value FCMAX as shown in FIG. 6B (set to 1 second in the figure). The unburned HC amount in the exhaust led into the catalytic converter 26 therefore decreases, the heat of reaction generated in the converter is suppressed and the temperature rise of the converter 26 is suppressed, but as the output torque of the engine 20 does not decrease, the slip of the drive wheels 28 is not adequately suppressed.

In the controller according to this invention as shown in FIG. 6A, however, when the fuel cut request continuation time exceeds the maximum continuation time FCMAX, the mode changes from the ordinary fuel cut mode to the multi-cylinder fuel cut mode, and the number of cylinders in which fuel injection stops increases.

When the slip factor of the drive wheels 28 increases to such an extent that the slip of the drive wheels 28 is not suppressed in the ordinary fuel cut mode, the output torque of the engine 20 decreases still further in the multi-cylinder fuel cut mode, so the slip of the drive wheels 28 is adequately suppressed.

Further, when the number of cylinders in which fuel injection stops increases, the temperature of the exhaust gas led to the catalytic converter 26 falls due to the fresh gas expelled from these cylinders, and due to the decrease in the number of cylinders where fuel injection occurs, unburned fuel flowing into the converter 26 also decreases. The reaction heat of unburned fuel in the converter 26 is therefore suppressed, and excessive temperature rise of the converter 26 is prevented.

As shown in FIG. 5, FCRATE is set to become smaller the lower the rotation speed of the engine 20 and the smaller the load on the engine 20. The maximum continuation time set value TFCTIM in the multi-cylinder fuel cut mode obtained from equation (4) therefore also becomes shorter the lower the rotation speed of the engine 20 and the lower the load.

As a result, in the low speed, low load region when the exhaust temperature of the engine 20 is low, the proportion of fuel cut which is carried out in the ordinary fuel cut mode is high. Conversely, in the high speed, high load region, the proportion of fuel cut which is carried out in the multi-cylinder fuel cut mode is high due to the increase of the maximum continuation time set value TFCTIM. In the low speed, low load region, therefore, the driver does not experience an excessive feeling of deceleration due to multi-cylinder fuel cut, while in the high speed, high load region, temperature rise of the catalytic converter is prevented.

In the multi-cylinder fuel cut mode, fuel cut requests disappear for a certain time, and when there is another fuel cut request, multi-cylinder fuel cut is restarted without performing ordinary fuel cut within the limit of the maximum continuation time set value TFCTIM. On the other hand, when there is a fuel cut request after the maximum continuation time set value TFCTIM has elapsed, ordinary fuel cut is performed first.

In this way, traction control can be performed within a wide range of running conditions of the engine 20 by changing the fuel cut mode according to the conditions.

However, when the engine is in the multi-cylinder fuel cut mode and fuel injection is cut in all cylinders, the slip factor sharply decreases and the drive wheels 28 grip. Also, when fuel injection is restarted in all cylinders, the slip factor S rapidly increases and the drive wheels 28 slip. As a result, hunting of the slip factor S begins so that the vehicle alternately accelerates and decelerates.

Figure 7:
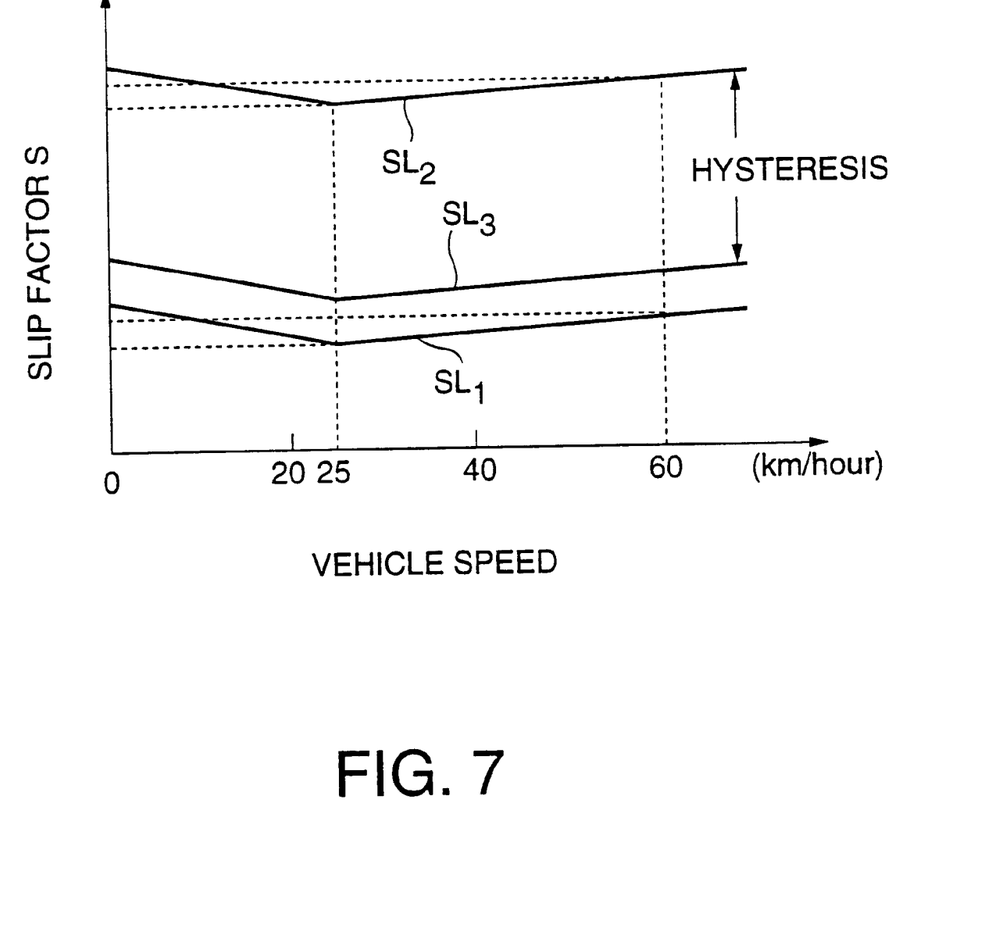
FIG. 7 is a map of threshold values stored in the control unit.

According to this invention therefore, to prevent the occurrence of hunting, a second threshold value $SL_2$ and third threshold value $SL_3$ for comparing with the slip factor in the multi-cylinder fuel cut mode are set to have larger values than the first threshold value $SL_1$ for comparing with the slip factor in the ordinary fuel cut mode as shown in FIG. 7.

The threshold value $SL_2$ for entering the multi-cylinder fuel cut is set larger than the threshold value $SL_3$ for terminating the multi-cylinder fuel cut by a predetermined hysteresis.

The threshold values $SL_1$, $SL_2$, $SL_3$ are also set such that they progressively decrease with increasing vehicle speed in the low vehicle speed region of 0–25 km/hr, and progressively increase with increasing vehicle speed in the medium/high vehicle speed region of 25 km/hr and above. This maintains the drive torque of the vehicle at a suitable value according to the vehicle speed.

Figure 8:
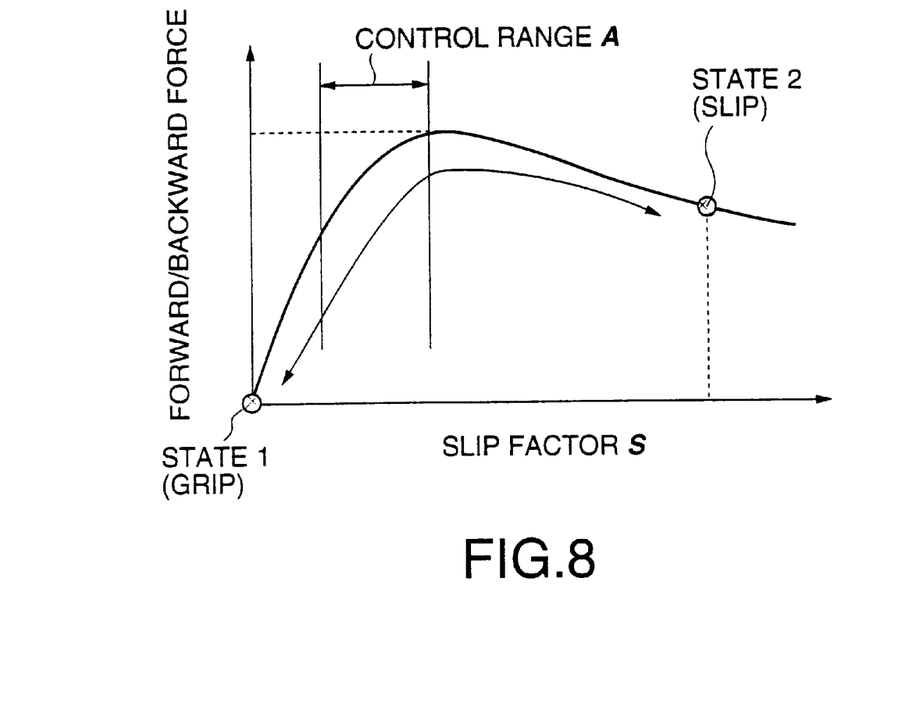
FIG. 8 is a graph showing a relation between the slip factor and a forward/backward force acting on a vehicle, according to this invention.

FIG. 8 shows the relation between the forward/backward force transmitted to the vehicle via the drive wheels 28, and the slip factor S. According to this graph, the forward/backward force is a maximum when the slip factor S has increased by a certain amount from when the vehicle is in a grip state.

Figure 9:
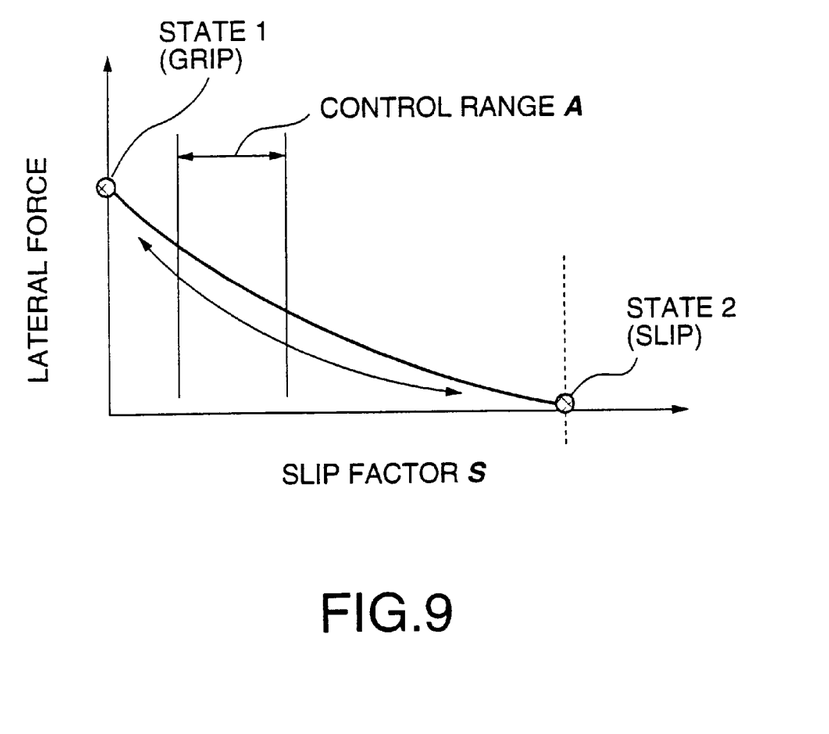
FIG. 9 is a graph showing a relation between the slip factor and a lateral force acting on the vehicle, according to this invention.

FIG. 9 shows the relation between the lateral force transmitted to the vehicle via the drive wheels 28 and the slip factor S when the vehicle is steered.

The lateral force is a maximum when the vehicle is in the grip state and progressively decreases as the vehicle speed increases.

Based on the characteristics of FIG. 8 and FIG. 9, according to this invention, a control range A of the slip factor S is set such that sufficient forward/backward force and lateral force of the vehicle are obtained via the drive wheels 28. The threshold value $SL_2$ for entering the multi-cylinder fuel cut and the threshold value $SL_3$ for releasing the multi-cylinder fuel cut are set so that they are within this range A.

A target slip factor setting unit 67 is therefore provided in the control unit 45. Into this target slip factor setting unit 67, current fuel cut mode data is input from the fuel cut cylinder change-over unit 58. The target slip factor setting unit 67 selects the threshold values $SL_2$, $SL_3$ for determining whether or not the vehicle has slipped in the multi-cylinder fuel cut mode, and selects the threshold value $SL_1$ for determining whether or not the vehicle has slipped in the ordinary fuel cut mode.

The torque-down request amount computing unit 54 computes a torque-down request amount D of the engine 20 using the threshold value $SL_1$ selected by the target slip factor setting unit 67. In the ordinary fuel cut mode, the torque-down request amount D is computed according to the threshold value $SL_1$ and slip factor S, while in the multi-cylinder fuel cut mode, the torque-down request amount D is computed according to the threshold values $SL_2$, $SL_3$ and slip factor S.

Figure 10:
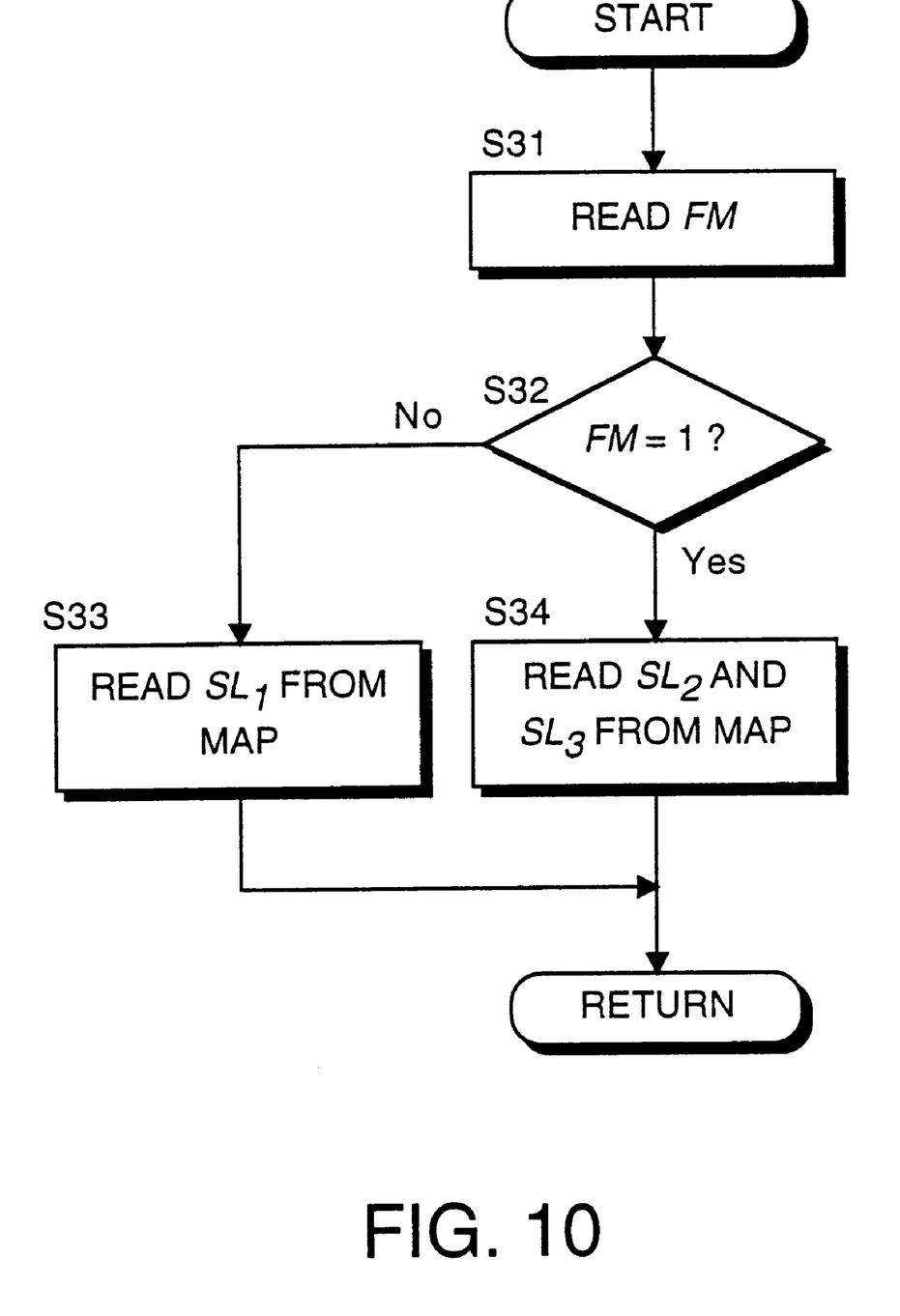
FIG. 10 is a flowchart describing a threshold value setting process performed by the control unit.

The flowchart of FIG. 10 shows a sub-routine to set the above threshold values performed by the control unit 45. This sub-routine is executed at a fixed interval.

First, in a step S31, the mode determining flag FM is read and in a step S32, it is determined whether the vehicle is in the ordinary fuel cut mode or the multi-cylinder fuel cut mode.

When FM=0, i.e., when it is determined that the vehicle is in the ordinary fuel cut mode, the routine proceeds to a step S33, and the first threshold value $SL_1$ is read from a map based on the vehicle speed (driven wheel speed $V_{PW}$).

When FM=1, i.e., when it is determined that the vehicle is in the multi-cylinder fuel cut mode, the routine proceeds to a step S34, and the threshold values $SL_2$, $SL_3$ are read from a map based on the vehicle speed (driven wheel speed $V_{PW}$).

Figure 11A:
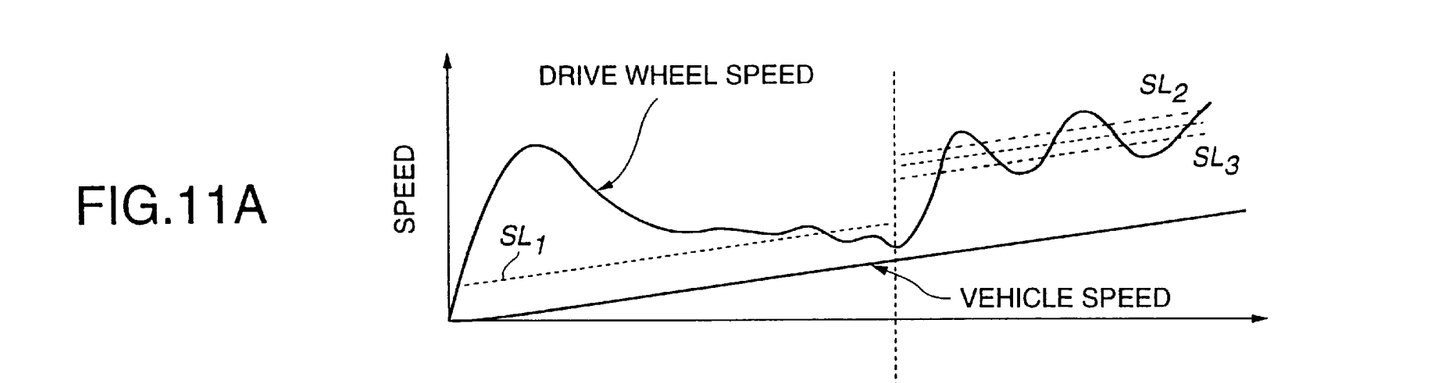
FIGS. 11A–11C are timing charts showing the variation of drive wheel speed, forward/backward force and the number of cylinders to which fuel supply is stopped, according to the control by the control unit.
Figure 11B:
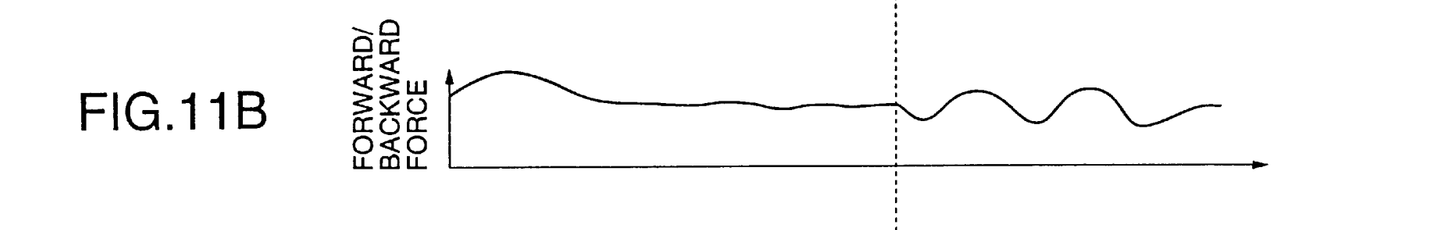
Figure 11C:
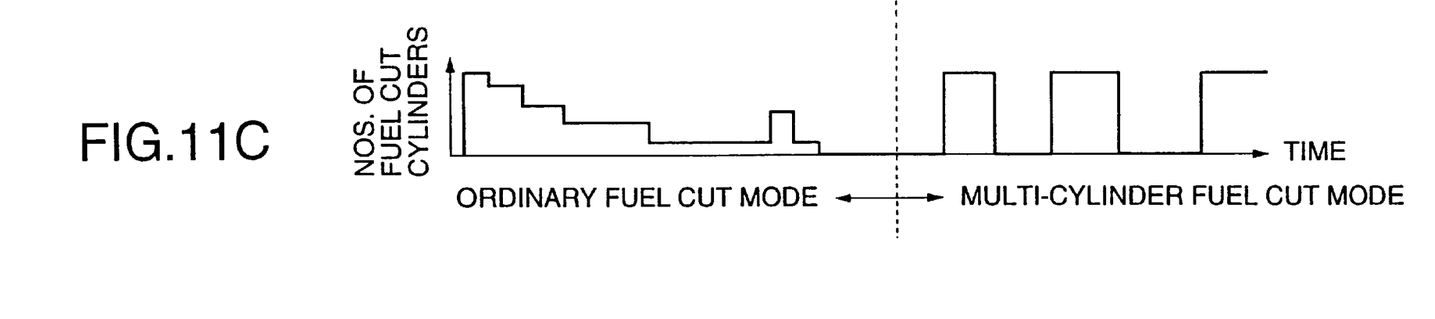

FIGS. 11A and 11C show examples of the control performed by this traction controller according to this invention. In the ordinary fuel cut mode, by controlling the number of cylinders in which fuel cut is performed to between 0 and 5, the drive wheel speed $V_{DW}$ is made to gradually approach the driven wheel speed $V_{PW}$, i.e., the vehicle speed. However when slip is still not adequately suppressed, the routine shifts to the multi-cylinder fuel cut mode, and fuel cut is changed over between 0 and 6 cylinders. In this case, the threshold value applied for determining whether the vehicle has slipped is set higher in the multi-cylinder fuel cut mode than in the ordinary fuel cut mode. In this way, severe hunting of the slip factor S is prevented, so the drive wheels 28 transmit sufficient drive force in both the forward/backward direction and the lateral direction to the vehicle when the vehicle is steered.

As a result, even if the output torque of the engine 20 is controlled in the multi-cylinder fuel cut mode when the vehicle is traveling on an icy road, the drive wheels 28 transmit a stable forward/backward force to the vehicle . The drive wheels 28 also transmit a stable lateral force to the vehicle when it is steered and suppress the alternative increase and decrease of the yawing force exerting on the vehicle.

The embodiments of this invention in which an exclusive property or privilege is claimed are defined as follows:

1. A traction controller to reduce a slip of drive wheels for a vehicle, comprising:
   a control unit programmed to
   compute a slip factor of drive wheels;
   determine whether or not said slip factor has exceeded a first threshold value;
   perform an ordinary fuel cut mode wherein fuel supply is cut to a certain number of cylinder(s) when said slip factor has exceeded said first threshold value;
   measure a first period during which said ordinary fuel cut mode is performed;
   determine whether or not said first period has exceeded a set value;
   determine whether or not said slip factor has exceeded a second threshold value, which is set to be higher than said first threshold value, when said first period has exceeded said set value; and
   perform a multi-cylinder fuel cut mode wherein fuel supply is cut to a number of cylinders greater than or equal to said certain number of cylinder(s) when said slip factor has exceeded said second threshold value, wherein fuel supply is recovered to all cylinders when said slip factor is at a point below said second threshold value.

2. A traction controller to reduce a slip of drive wheels for a vehicle, comprising:
   a control unit programmed to
   compute a slip factor of drive wheels;
   determine whether or not said slip factor has exceeded a first threshold value;
   perform an ordinary fuel cut mode wherein fuel supply is cut to a certain number of cylinder(s) when said slip factor has exceeded said first threshold value;
   measure a first period during which said ordinary fuel cut mode is performed;
   determine whether or not said first period has exceeded a set value;
   determine whether or not said slip factor has exceeded a second threshold value, which is set to be higher than said first threshold value, when said first period has exceeded said set value;
   determine whether or not said slip factor has become less than a third threshold value, which is set to be smaller than said second threshold value, but larger than said first threshold value, when said first period has exceeded said set value; and
   perform a multi-cylinder fuel cut mode wherein fuel supply is cut to a number of cylinders greater than or equal to said certain number of cylinder(s) when said slip factor has exceeded said second threshold value, wherein fuel supply is recovered to all cylinders when said slip factor has become less than said third threshold value.

3. A traction controller as defined in claim 2, wherein in said multi-cylinder fuel cut mode, whether multi-cylinder fuel cut is performed or not is determined based on said slip factor, said second threshold value for entering multi-cylinder fuel cut and said third threshold value for terminating multi-cylinder fuel cut.

4. A traction controller as defined in claim 2, wherein said first threshold value decreases with increasing vehicle speed in a vehicle speed range below a predetermined speed, and increases with increasing vehicle speed in a vehicle speed range above said predetermined speed.

5. A traction controller as defined in claim 2, wherein said second threshold value decreases with increasing vehicle speed in a vehicle speed range below a predetermined speed, and increases with increasing vehicle speed in a vehicle speed range above said predetermined speed.

6. A traction controller as defined in claim 5, wherein said third threshold value decreases with increasing vehicle speed in a vehicle speed range below a predetermined speed, and increases with increasing vehicle speed in a vehicle speed range above said predetermined speed.

7. A traction controller as defined in claim 2,
   further programmed to
   measure a second period during which said multi-cylinder fuel cut mode is performed;
   determine whether or not said second period has exceeded a predetermined value;
   terminate said multi-cylinder fuel cut mode when said second period has reached said predetermined value.

8. A traction controller to reduce a slip of drive wheels for a vehicle, comprising:
   means for computing a slip factor of drive wheels;
   means for determining whether or not said slip factor has exceeded a first threshold value;
   means for performing an ordinary fuel cut mode wherein fuel supply is cut to a certain number of cylinder(s) when said slip factor has exceeded said first threshold value;
   means for measuring a first period during which said ordinary fuel cut mode is performed;
   means for determining whether or not said first period has exceeded a set value;
   means for determining whether or not said slip factor has exceeded a second threshold value, which is set to be higher than said first threshold value, when said first period has exceeded said set value;
   means for determining whether or not said slip factor has become less than a third threshold value, which is set to be smaller than said second threshold value, but larger than said first threshold value, when said first period has exceeded said set value; and
   means for performing a multi-cylinder fuel cut mode wherein fuel supply is cut to a number of cylinders greater than or equal to said certain number of cylinder(s) when said slip factor has exceeded said second threshold value, wherein fuel supply is recovered to all cylinders when said slip factor has become less than said third threshold value.

* * * * *